United States Patent [19]

Driscoll

[11] 4,045,642

[45] Aug. 30, 1977

[54] ELECTRODE HOLDER

[76] Inventor: John J. Driscoll, 422 S. 18th St., Allentown, Pa. 18104

[21] Appl. No.: 652,186

[22] Filed: Jan. 26, 1976

[51] Int. Cl.² ............................................. B23K 9/16
[52] U.S. Cl. ....................................... 219/70; 219/75; 219/144
[58] Field of Search ................... 219/68, 70, 72, 74, 219/75, 138, 144

[56] References Cited

U.S. PATENT DOCUMENTS

| 1,869,341 | 7/1932 | May | 219/75 |
| 2,880,302 | 3/1959 | Cresswell | 219/74 |
| 3,113,201 | 12/1963 | Stepath | 219/70 |
| 3,210,514 | 10/1965 | Stepath | 219/70 |
| 3,387,111 | 6/1968 | Driscoll | 219/70 |
| 3,624,339 | 11/1971 | Jenkins | 219/70 |

Primary Examiner—Bruce A. Reynolds
Assistant Examiner—N. D. Herkamp
Attorney, Agent, or Firm—Stanley B. Kita

[57] ABSTRACT

A holder for a consumable electrode used to cut metal by means of an electric arc is disclosed. The holder has an elongated barrel for containing the electrode and a pistol grip depending from the barrel for supplying electrical energy to the electrode. The exposed length of the electrode can be adjusted by a ram which slides in the barrel behind the electrode and which cooperates with clamping means actuated by a trigger on the pistol grip to secure the electrode at any adjusted length. Compressed air and electrical energy are supplied to the base of the pistol grip and are respectively communicated to a nozzle at the front end of the barrel and to the electrode. The nozzle is mounted for rotation relative to the electrode and has orifices for ejecting the air along any desired side of the electrode. Manifold means in the nozzle insures a continuous supply of compressed air to the orifices irrespective of the angular position of the nozzle. A metallic heat shield protects the nozzle from radiation, and a shield depends from the barrel in front of the pistol grip to protect a workman's fingers from excessive radiation. The inside of the head is designed to maximize the flow of compressed air through the orifices.

13 Claims, 8 Drawing Figures

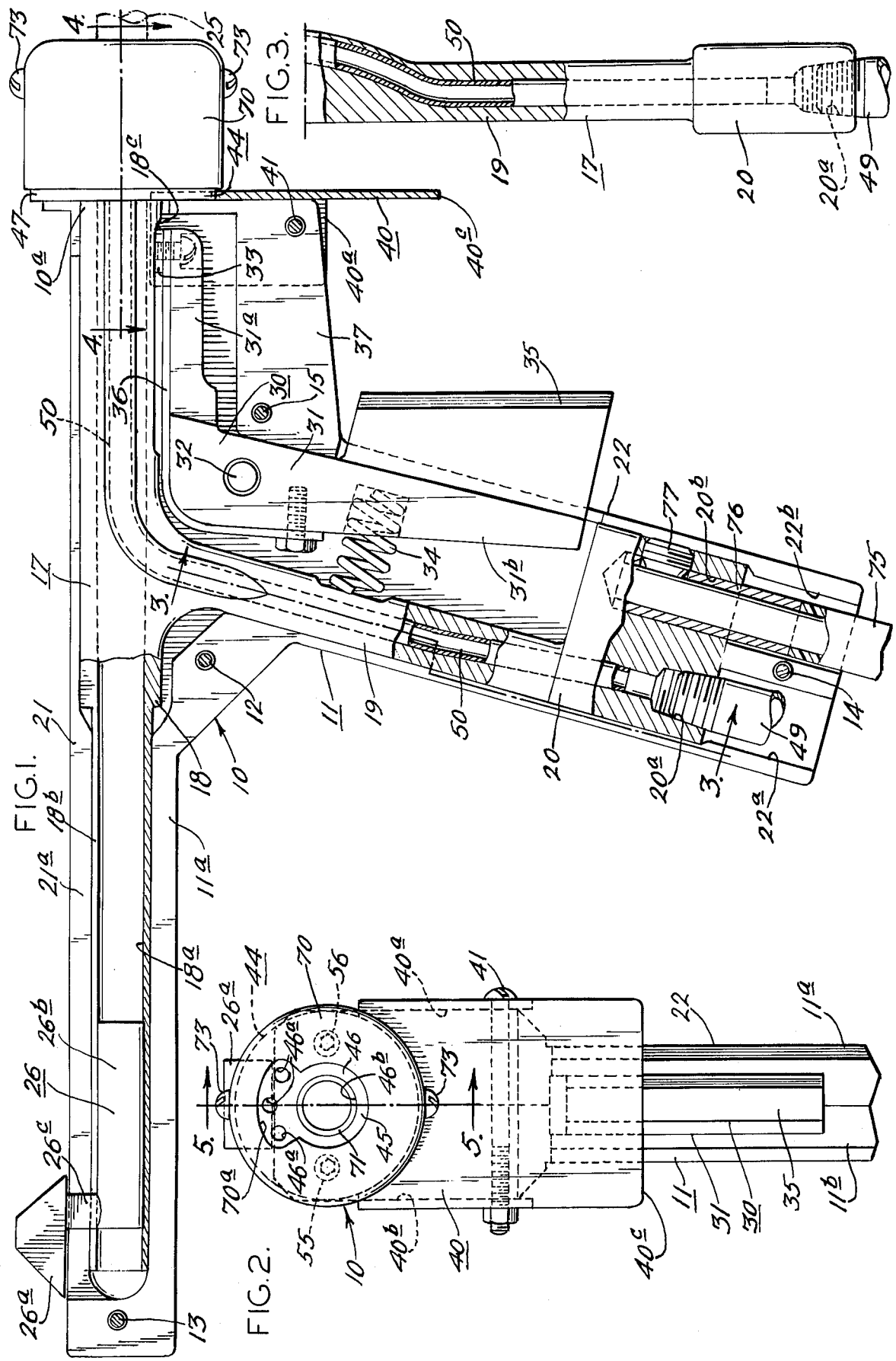

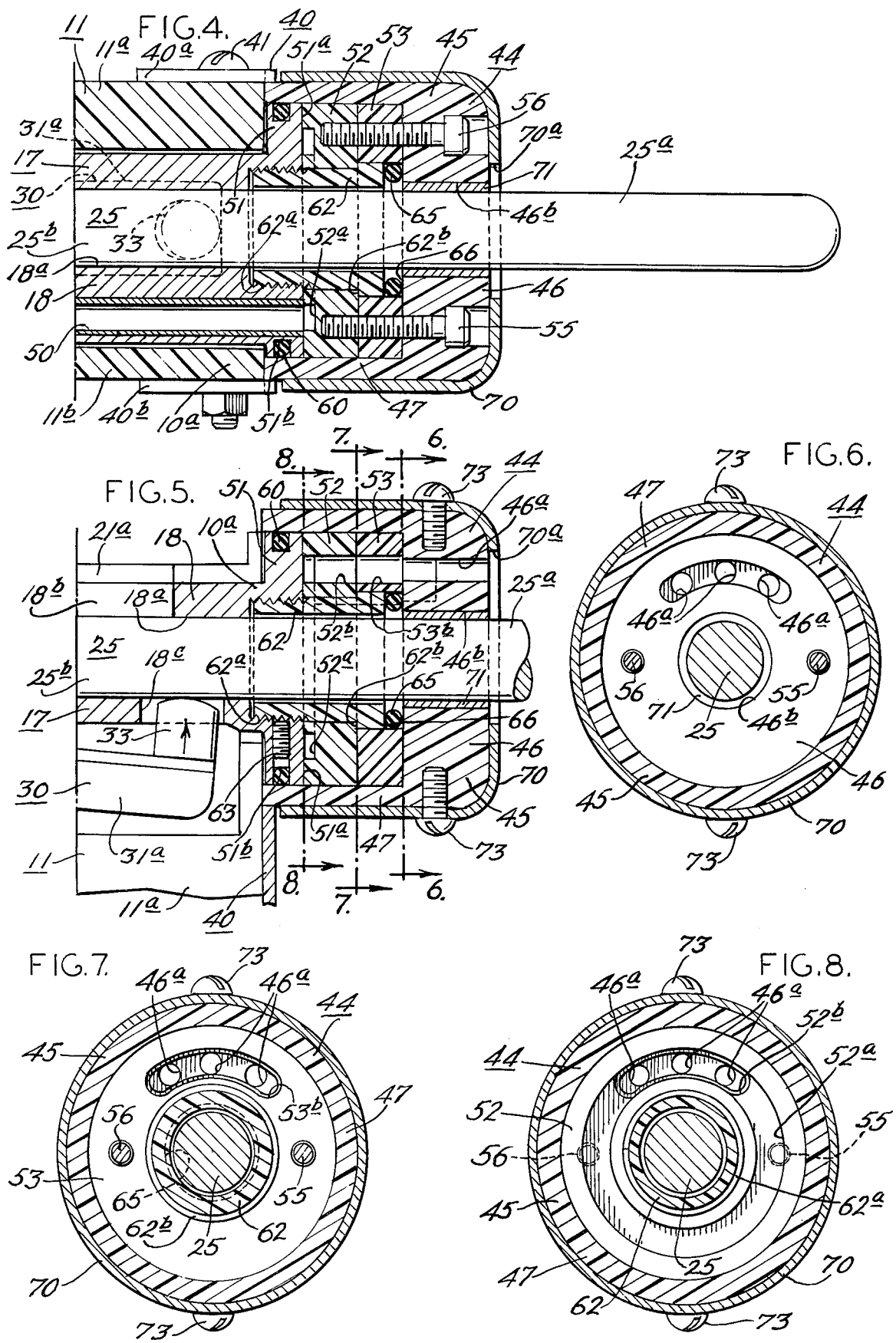

ELECTRODE HOLDER

The present invention relates to tools for working metal by means of an electric arc, and more particularly, the present invention relates to hand held tools for supplying electrical energy to consumable electrodes.

In my U.S. Pat. No. 3,387,111 there is disclosed a tool for cutting or gouging metal by means of an electric arc. The tool has an elongated barrel with a depending pistol grip adjacent its rear end and a nozzle mounted at its front end. The barrel contains an electrode which can be displaced axially by a ram mounted in the barrel which cooperates with primary and secondary clamping means in the barrel nozzle, respectively, to secure the electrode at any adjusted length. The nozzle is mounted for rotation relative to the electrode to blow molten metal away from the melt zone.

Although the tool described in my above patent may function satisfactorily, it has certain limitations. For instance, the pistol grip is located toward the rear of the barrel. Thus, it is not as easy to control the motion of the electrode as desired. Also, the absence of seals in the nozzle enables air to escape therefrom and this minimizes the flow of air along the electrode. Furthermore, the construction of the tool is such as to make it necessary for the workmen to disconnect the power supply to the tool when rotating the nozzle from one position to another and when adjusting the exposed length of the electrode. Accordingly, it should be apparent that a tool which does not have these limitations is commercially desirable.

With the foregoing in mind, it is a primary object of the present invention to provide a new electrode holder which is an improvement over the electrode holder described in my aforementioned patent.

It is another object of the present invention to provide an electrode holder which is easy to control and which is entirely safe to use.

As a further object, the present invention provides an electrode holder having an improved nozzle which is capable of ejecting a maximum flow of air along the electrode yet which can be rotated about the electrode without turning off power to the holder.

As a still further object, the present invention provides a durable electrode holder which is economical to manufacture and maintain.

It is still a further object of the present invention to provide a well insulated electrode holder which can be used efficiently to work metal by means of an electric arc.

More specifically, the present invention provides a hand held electrode holder having an electrode-receiving barrel with a pistol grip depending therefrom adjacent the front of the barrel. A radiation shield depends from the barrel in front of the pistol grip to protect a workman's hand from radiation. A nozzle is mounted for rotation on the front end of the barrel and has orifices for ejecting a stream of air along the electrode. Manifold means in the nozzle provides continuous communication between the orifices and an air supply pipe which extends from the base of the pistol grip to the front of the barrel. The interior of the nozzle has sealing means which prevents the escape of air therefrom to maximize the flow of air along the electrode. The nozzle is fabricated of electrical insulation material which is protected from radiation by a metallic radiation cap.

These and other objects, features and advantages of the present invention should become apparent from the following description when taken in conjunction with the accompanying drawings in which:

FIG. 1 is a longitudinal sectional view of an electrode holder embodying the present invention;

FIG. 2 is a fragmentary front elevational view thereof;

FIG. 3 is a fragmentary sectional view taken on line 3—3 of FIG. 1;

FIG. 4 is an enlarged sectional view taken on line 4—4 of FIG. 1;

FIG. 5 is an enlarged sectional view taken on line 5—5 of FIG. 2; and

FIGS. 6, 7 and 8 are sectional views taken on lines 6—6, 7—7 and 8—8, respectively of FIG. 5.

Referring now to the drawings, FIG. 1 illustrates a metal working tool 10 embodying the present invention. The tool 10 has a molded plastic case 11 of electrical insulation material and is composed of complementary half-sections 11a and 11b connected together at spaced locations by transverse bolts 12, 13, 14 and 15. The case 11 houses a metal casting 17 having a elongated barrel 18 adapted slidably to receive an electrode 25, a stem 19 depending from the barrel 18, and a service block 20 at the base of the stem 19 for supplying air and electrical energy to the tool 10. The case 11 has an elongated barrel portion 21 which encloses the barrel 18 of the casting 17 and a pistol grip 22 which encloses the stem 19 and service block 20.

In the present invention, the pistol grip 22 depends from the barrel portion 21 of the case 11 significantly closer to the front end 10a of the tool 10 than the rear end thereof. Preferably, the pistol grip 22 has a rearward rake with respect to the barrel 21 and merges with the barrel 21 at about ¼ to ⅓ of the distance from its front end 10a. As a result, the tool 10 is gripped relatively close to its front or working end, and this affords greater control over the movement of the tool.

The barrel 18 of the casting 17 has an elongated bore 18a which is dimensioned to receive electrodes having standard lengths and diameters. The barrel 18 is dimensioned lengthwise to receive substantially the entire length of the electrode 25 with the exception of a small exposed portion 25a which protrudes from the front of the tool 10 when the electrode is initially inserted therein. Thus, direct contact between the unused portion of the electrode stored inside of the case 11 for future use is avoided, and this is important in preventing the electrode (which can become hot in use) from contacting and possibly melting the rear barrel portion of the case 11.

The exposed length of the electrode 25a is adjustable in use. To this end, a ram 26 is provided to engage the rear end of the electrode 25 in the barrel 18. The ram 26 has a finger grip 26a on the outside of the casing 11 and a cylindrical plunger 26b slidable axially in the bore 18a of the barrel 18. A web 26c connects the finger grip 26a with the plunger 26b. The barrel portion 21 of the case 11 and the upper portion of the casting-barrel 18 are provided with aligned slots 21a and 18b, respectively, which guide the web 26c of the ram 26. Preferably, the web 26c, the plunger 26b and the finger grip 26a are molded of electrical insulation material similar to the material of the case 11. A metal cap (not shown) is preferably fastened to the front of the plunger 26b to protect the same against heat damage from being in contact with the rear of a hot electrode. Thus, rightward movement of the ram 26 causes the electrode to slide axially in the barrel 18 to expose a new length 25a of the electrode to compensate for the length of electrode consumed.

In order to maintain the electrode in positive electrical contact with the barrel 18, the case 11 mounts a clamping assembly 30. As best seen in FIG. 1, the clamping assembly 30 includes an L-shaped rocker 31 having a forwardly extending arm 31a underlying the front end of the barrel 18 and an arm 31b depending inside the pistol grip 22. The rocker 31 is mounted to pivot about a pin 32 located adjacent the intersection of the arms 31a and 31b. The arm 31a mounts an upstanding contact 33 at its forwardmost end, and the contact 33 protrudes upwardly through a hole 18c in the bottom of the barrel 18 adjacent its front end. The contact 33 is urged firmly against the bottom of the electrode 25 by a compression spring 34 mounted between the stem 19 of the casting 17 and the inside of the depending rocker arm 31b. Thus, the rocker 31 is biased in the counter-clockwise direction about its pivot pin 32 to cause the contact 33 firmly to engage the underside of the electrode 25 in the barrel 18 and to force the electrode 25 into positive electrical contact with the barrel 18. The rocker 31 is pivoted in the opposite direction to disengage the contact 33 from the electrode 25 by means of a trigger 35 which protrudes forwardly from the depending rocker arm 31b outside of the pistol grip 22. Thus, the length of the exposed portion 25a of the electrode 25 can be adjusted readily by a workman simply by squeezing the trigger 35 while pushing the ram 26 forwardly. Preferably, the rocker 31 is reinforced by a strip of metal 36 secured along the innermost edges of the rocker arms 31a and 31b.

Radiation is emitted by the electric arc from the tip of the electrode 25 to a workpiece (not shown). In order to protect the fingers of the workman from the harmful effects of such radiation, a radiation plate 40 is provided at the front of the tool 10. As best seen in FIG. 2, the radiation plate 40 depends from the front of the case 11 ahead of the trigger 35. Preferably, the radiation plate 40 is fabricated of nonferrous metal, such as copper, to prevent molten slag from adhering to the front of the plate 40. The plate 40 is mounted to the tool 10 by a pair of reversely-turned flanges 40a and 40b which extend along a gusseted portion 37 of the case 11 immediately above the trigger 35, and the flanges 40a and 40b are fastened to the casing gusset 37 by a transverse bolt 41. As seen in FIG. 2, the radiation plate 40 is dimensioned widthwise greater than the width of the pistol grip 22. The plate 40 is shorter in length or depth than the trigger 35; however, because the radiation is generated at a location well above the lower edge 40c of the plate 40, the plate shadows a considerable portion of the pistol grip 22. Thus, the radiation plate 40 provides maximum protection with a minimum of structure which could interfere with the use of the tool 10.

The tool 10 is designed to blow a stream of compressed air forwardly along the exposed portion 25a of the electrode 25 to displace molten metal of the workpiece away from the zone of the electric arc. To this end, a nozzle or head assembly 44 is provided at the front 10a of the case 11. The nozzle assembly 44 comprises a hollow head member 45 having a front wall 46 with a series of orifices 46a,46a therein. As best seen in FIG. 2, the orifices 46a,46a are disposed in an arcuate array closely adjacent an electrode-receiving central aperture 46b in the front wall 46. In order to supply compressed air to the nozzle assembly 44, the bottom of the service block 20 has an internally threaded recess 20a for receiving a length of conventional flexible air hose 49 connected to a source of compressed air (not shown). The recess 20a is connected to the inside of the nozzle assembly 44 by a tube 50 which extends upwardly inside the stem 19 and forwardly alongside the barrel 18. As best seen in FIG. 4, the barrel 18 has an annular flange 51 extending radially outward at its front end, and the tube 50 terminates inside the flange 51 (See FIG. 4).

For the purpose connecting the tube 50 to the orifices 46a,46a to ensure continuous gas communication thereto irrespective of their angular position, manifold means is provided in the nozzle assembly 44. In the illustrated embodiment, the manifold means comprises a pair of rings 52 and 53 mounted between the barrel flange 51 and the front wall 46 of the head 45. The head 45 has a tubular wall 47 extending rearwardly from the front wall 46 and surrounding the rings 52 and 53 and the periphery of the barrel flange 51. As best seen in FIGS. 4 and 8, the manifold ring 52 has an annular groove 52a which faces rearwardly toward the front face 51a of the barrel flange 51. The manifold ring 52 also has an arcuate shaped aperture 52b connecting the groove 52a with a similar-shaped aperture 53b in the spacer ring 53 located forwardly of the grooved ring 52. The aperture 53b in the spacer ring 53 registers with the orifices 46a,46a in the front wall 46 of the head 45. The rings 52 and 53 are connected to the front wall 46 of the head 45 by cap screws 55 and 56 so that the rings 52 and 53 rotate in unison with the head 45 to provide continuous gas communication between the tube 50 and the orifices 46a,46a.

In order to maximize the discharge of air from the orifices 46a,46a, the tool 10 is designed so that leakage of air from the head 45 is avoided. For this purpose, inner and outer sealing means is provided in the nozzle assembly. In the illustrated embodiment, the outer sealing means is located between the outer periphery of the barrel flange 51 and the inside of the tubular wall 47 of the head 45. As best seen in FIGS. 4 and 5, the flange 51 has a peripheral groove 51b, and a sealing ring, in the present instance a O-ring 60, is mounted in the groove 51b. The O-ring 60 is compressed radially and sealingly engages the inner surface of the wall 47 to cooperate therewith to prevent air from escaping rearwardly from the nozzle assembly 44.

The nozzle assembly 44 is rotatably mounted on the front end of the barrel 18 by means of a journal 62 of electrical insulation material. The journal 62 has a central axial bore aligned with the barrel bore 18a and an externally threaded end 62a threadedly received in an internally threaded recess in the front end of the barrel-bore 18a. The journal 62 also has a radially-extending flange 62b which engages the front of the grooved manifold ring 52. Thus, the journal 62 may be screwed inwardly to cause the rearward face of the manifold ring 52 to engage firmly the front face of the barrel-flange 51. This is important in limiting the escape of compressed air from the head, since pressure acting forwardly in the manifold ring groove 52a tends to force the manifold ring 52 frontward away from the barrel-flange 51. The journal 62 is secured against rotation with the head 45 by a set screw 63 which is accessible upon removal of the O-ring 60 from its groove 51b in the barrel-flange 51. Thus, the journal 62 may be periodically tightened, if necessary, to compensate for wear of the manifold ring 52.

In order to prevent compressed air from leaking inwardly from the manifold rings 52 and 53 and escaping through the electrode aperture 46b in the head wall 46, inner sealing means is provided. As best seen in FIG. 5, the inner sealing means includes an axially-compressible O-ring 65 and means forming an inwardly-open groove 66 confronting the electrode 25 and mounting the O-ring 65. In the illustrated embodiment, the groove 66 is provided between the front surface of the circular journal flange 62b, the rear surface of the front wall 46, and the circular inside periphery of the spacer ring 53. The spacer ring 53 rotates on the journal flange 62b, and the thickness of the spacer ring 53 is selected to ensure the application of adequate axial compression on the O-ring 65 to ensure a leak-resistant seal. Since the O-ring is out of contact with the electrode 25 and is surrounded by insulation, it is protected against deterioration due to radiation. Thus, the inner and outer O-ring seals cooperate in the nozzle assembly 44 to minimize leakage of compressed air therefrom and thereby to maximize the flow of air along the electrode.

The nozzle assembly 44 is subjected to intense radiation from the electric arc when the tool 10 is in use. In order to protect the head 45 from the deleterious effects of such radiation, a metal radiation cap 70 is provided therefor. As best seen in FIGS. 1 and 2, the cap 70 surrounds the tubular wall 47 of the head 45 and substantially the entire front wall 46, except for the keyhole like cut-out 70a which exposes the orifices 46a, 46a and the aperture 46b in the front wall 46 of the head 45. The cap 70 is removably secured to the head 45 by radially extending screws 73,73. A tubular metal sleeve 71 is mounted in the head aperture 46b to provide a heat and wear resistant guide for the electrode 25. The cut-out 70a is spaced from the sleeve 71 so that the electrode 25 is electrically insulated from the cap 70. Thus, with this structure, a workman can rotate the nozzle assembly 45 in complete safety while adjusting the direction of air flow from the tool 10. Preferably, the cap 70 is fabricated of copper or other non-ferrous metal.

The electrical energy and air are supplied safely to the tool 10. For this purpose, the base of the pistol grip 22 is provided with a pair of upwardly-projecting bores 22a and 22b for receiving the air hose 49 and an insulated electrical cable 75, respectively. Insulation is stripped from the end of the cable 75, and the stripped end is inserted in a sleeve 76 mounted in a recess 20b in the service block 20. A set screw 77 is threadedly received in the service block 20 and engages laterally against the exposed portion of the cable 75 to provide a positive electrical connection of the cable 75 to the service block 20. Since the set screw 77 is completely enclosed by the pistol grip 22, it is electrically insulated from the hand of the workman using the tool. Access to the set screw 77 is provided by disassembling the two sections of the case 11. Thus, the pistol grip 22 supports short sections of both the air hose 49 and the electrical cable 75 adjacent their connection to the service block 20 and prevents them from inadvertently being broken off.

In view of the foregoing, it should be apparent that a novel tool has now been provided for use in working metal by means of an electric arc. The tool is efficient in operation, simple in construction, safe to use, and economical to manufacture and maintain.

While a preferred embodiment of the present invention has been described in detail, various modifications, alterations and changes may be made without departing from the spirit and scope of the present invention as defined in the appended claims.

I claim:

1. In a hand-held tool for use in working metal by means of an electric arc; said tool including barrel means adapted to contain an elongated electrode; pistol grip means depending from said barrel; means actuated by a trigger carried by said pistol grip for releasably clamping said electrode in said barrel means with an exposed length of the electrode extending axially forward beyond the front end of said barrel means; means in said pistol grip for supplying electrical energy to said electrode in said barrel means; and rotary nozzle means located at the front of said barrel means for flowing a gaseous medium along the exposed length of the electrode; said nozzle means including a head having orifice means for ejecting said gaseous medium therefrom, means mounting said head to the front of said barrel means for rotation coaxial therewith, means for supplying said gaseous medium under pressure to said head, and annular manifold means located intermediate said supply means and said orifice means to provide gas communication between said supply means and said orifices; the improvement wherein said head has a front wall with an electrode receiving aperture and a tubular wall extending rearwardly from said front wall and surrounding at least a portion of said barrel means, means providing an outer seal compressible radially between said tubular wall and said barrel means to prevent escape of said gaseous medium rearwardly from said manifold means, and means providing an inner seal compressible axially between the front wall of said head and said head mounting means to prevent escape of said gaseous medium inwardly from said manifold means.

2. Apparatus according to claim 1 wherein said outer seal providing means includes means providing a peripheral groove in said barrel confronting said tubular wall, and an O-ring mounted in said groove and sealingly engaging said tubular wall.

3. Apparatus according to claim 1 wherein said inner seal means includes an annular surface on said head mounting means confronting the inside of the front wall of said head around said electrode receiving aperture, and an O-ring compressed between said annular surface and the front wall of said head.

4. A handheld tool for use in working metal by means of an electric arc; said tool including barrel means adapted to contain an elongated electrode; pistol grip means depending from said barrel; means actuated by a trigger carried by said pistol grip for releasably clamping said electrode in said barrel means with an exposed length of the electrode extending axially forward beyond the front end of said barrel means; radiation shield means depending from said barrel means in front of said pistol grip to cause a substantial portion of the pistol grip to be shadowed from radiation generated by the electrode; means in said pistol grip for supplying electrical energy to said electrode in said barrel means; rotary nozzle means located at the front of said barrel means for flowing a gaseous medium along the exposed length of the electrode, said nozzle means including a head having a tubular wall and a front wall with an electrode-receiving aperture aligned with said barrel, said front wall also having orifice means for ejecting said gaseous medium therefrom; a journal member having one end engaged in said barrel means and having a flange on its other end for mounting said head to the front of said barrel means for rotation coaxial therewith; means in said barrel means affording axial adjustment of said journal member; means for supplying said gaseous medium under pressure to said head; a manifold ring located intermediate said supply means and said orifice means to provide gas communication between said supply means and said orifice means; said manifold ring engaging the front of said barrel means and having a rearwardly-facing groove in registry with said supply means; means connecting said manifold ring and head for rotation in unison; means providing an outer seal compressed radially between said tubular wall and said barrel means to prevent escape of said gaseous medium rearwardly from said manifold means; and means providing an inner seal compressed axially between the front wall of said head and the journal member flange to prevent escape of gaseous medium inwardly from said manifold means.

5. Apparatus according to claim 4 wherein said radiation shield includes a pair of rearwardly-turned flanges extending along opposite sides of said barrel means, and means connecting said flanges to said barrel means.

6. Apparatus according to claim 4 wherein said radiation shield has a widthwise dimension greater than the width of said pistol grip and a lengthwise dimension less than the length of said pistol grip.

7. Apparatus according to claim 4 wherein said radiation shield is imperforate and is fabricated of a nonferrous metal.

8. Apparatus according to claim 7 wherein said nonferrous metal is copper.

9. In a hand-held tool for use in working metal by means of an electric arc; said tool including barrel means adapted to contain an elongated electrode; pistol grip means depending from said barrel; means actuated by a trigger carried by said pistol grip for releasably clamping said electrode in said barrel means with an exposed length of the electrode extending axially forward beyond the front end of said barrel means; means in said pistol grip for supplying electrical energy to said electrode in said barrel means; and rotary nozzle means located at the front of said barrel means for flowing a gaseous medium along the exposed length of the electrode; said nozzle means including a head having orifice means for ejecting said gaseous medium therefrom, means mounting said head to the front of said barrel means for rotaton coaxial therewith, means for supplying said gaseous medium under pressure to said head, and annular manifold means located intermediate said supply means and said orifice means to provide gas communication between said supply means and said orifices; the improvement wherein said manifold means includes a manifold ring engaging the front of said barrel means and having a rearwardly-facing annular groove in registry with said gaseous medium supply means, said means rotatably mounting said head including a journal member having one end threadedly received in said barrel means and having an outwardly extending annular flange at its other end engaging said manifold ring to maintain the same engaged with the front of said barrel means, securing means carried by said barrel means releasably engaging said threaded end of said journal member, and means connecting said manifold ring to said head for rotation in unison therewith.

10. Apparatus according to claim 9 wherein said journal member flange has a circular outer periphery and said manifold means includes a spacer ring mounted to rotate on said periphery along with said manifold ring, said orifice means including a series of orifices disposed in an arcuate array in said front wall of said head and said manifold ring and spacer ring both having arcuate apertures communicating said orifices with said annular groove in said manifold ring.

11. Apparatus according to claim 10 wherein said spacer ring has a inner peripheral surface extending axially between the front of said journal flange and the inside of said front wall for cooperating therewith to define an inwardly-open groove adapted to receive an O-ring therein.

12. Apparatus according to claim 9 wherein said journal member is fabricated of electrical insulation material.

13. A handheld tool for use in working metal by means of an electric arc; said tool including barrel means adapted to contain an elongated electrode; pistol grip means depending from said barrel; means actuated by a trigger carried by said pistol grip for releasably clamping said electrode in said barrel means with an exposed length of the electrode extending axially forward beyond the front end of said barrel means; means in said pistol grip for supplying electrical energy to said electrode in said barrel means; rotary nozzle means located at the front of said barrel means for flowing a gaseous medium along the exposed length of the electrode, said nozzle means including a head having a tubular wall and a front wall with an electrode-receiving aperture aligned with said barrel, said front wall also having orifice means for ejecting said gaseous medium therefrom; a journal member having one end threadedly engaged in said barrel and having a flange on its other end for mounting said head to the front of said barrel means for rotation coaxial therewith; means in said barrel means for releasably engaging said threaded end of said journal member; means for supplying said gaseous medium under pressure to said head; a manifold ring located intermediate said gaseous medium supply means and said orifice means to provide gas communication between said supply means and said orifice means; said manifold ring engaging the front of said barrel means and having a rearwardly-facing groove in registry with said gaseous medium supply means; means connecting said manifold ring and said head for rotation in unison; means providing an outer seal compressed radially between said tubular wall and said barrel means to prevent escape of said gaseous medium rearwardly from said manifold means; and means providing an inner seal compressed axially between the front wall of said head and the journal member flange to prevent escape of gaseous medium inwardly from said manifold means.

* * * * *